Dec. 30, 1958  R. M. STIKELEATHER  2,866,257
MACHINE FOR CUTTING OFF LENGTHS OF FINNED TUBING
Filed Jan. 23, 1956  3 Sheets-Sheet 1
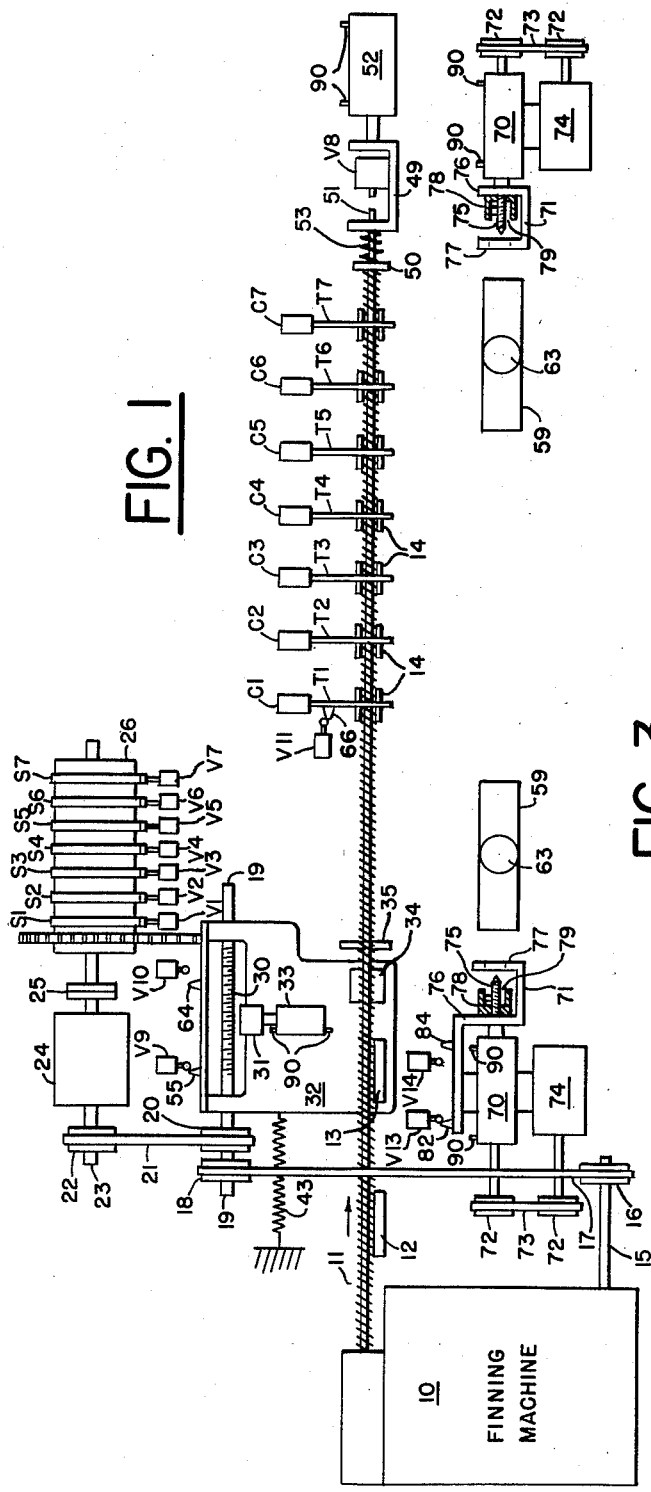
Robert M. Stikeleather
INVENTOR
BY Robert J. Palmer
ATTORNEY Dec. 30, 1958 R. M. STIKELEATHER 2,866,257
MACHINE FOR CUTTING OFF LENGTHS OF FINNED TUBING
Filed Jan. 23, 1956 3 Sheets-Sheet 2

Robert M. Stikeleather
INVENTOR
BY Robert J. Palmer
ATTORNEY

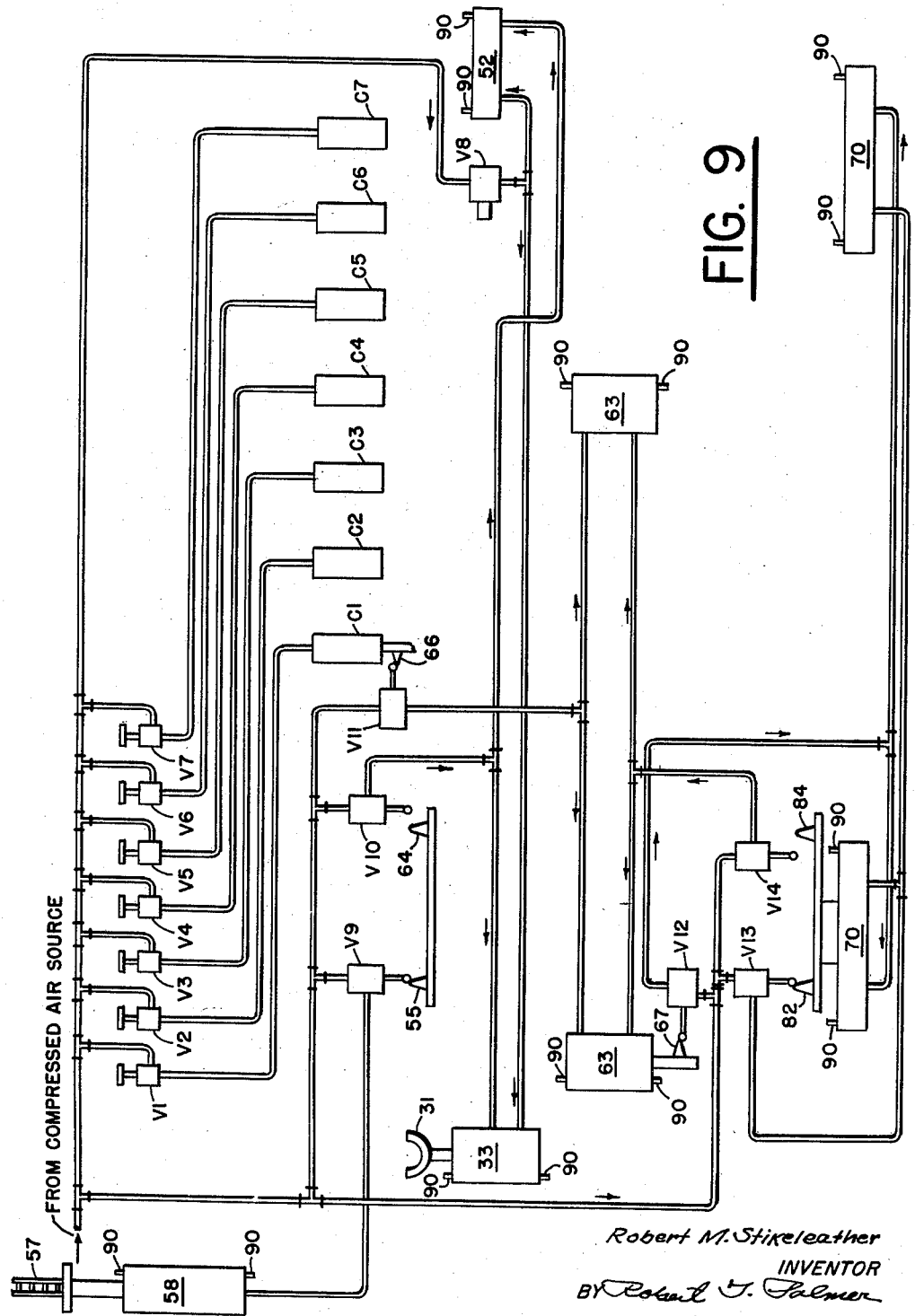

United States Patent Office 2,866,257
Patented Dec. 30, 1958

2,866,257

MACHINE FOR CUTTING OFF LENGTHS OF FINNED TUBING

Robert M. Stikeleather, Holbrook, Mass.

Application January 23, 1956, Serial No. 560,682

5 Claims. (Cl. 29—69)

This invention relates to the manufacture of finned heat exchange tubes, and relates more particularly to the cutting of finned tubing to predetermined lengths as it emerges from a finning machine.

Hollow heat exchange tubes having extended surface fins on their outer surfaces are widely used for heating and cooling gases such as air, and are usually included in what are known as "coils" which have rows of straight finned tubes connected at their ends by headers or return bends. In the past, it has been the practice to apply fins to twenty foot lengths of tubing, and to store the twenty foot lengths of finned tubing produced by a finning machine. Then, when a coil was to be made up, the tubes for the coil were cut from the stored finned tubes twenty feet long. This has resulted in a waste of time and material.

This invention greatly reduces the manufacturing cost of coils by cutting the finned tubing as it emerges from a finning machines to the correct lengths, without stopping the finning machine, and without damage to the finned tubing.

In one embodiment of this invention, as a finned tube emerges from a finning machine, at spaced-apart points along its length or line of advance, tongs carrying rollers are closed around it in succession shortly after its advancing end passes each of the tongs, the closing of the tongs being synchronized with the tube advancing mechanism of the finning machine. The rollers of the tongs permit the finned tubing to rotate and advance but limit its lateral movement so that it continues to advance along a straight path. Shortly before a desired length of tubing has emerged from the finning machine, a saw for cutting the finned tubing is caused to move alongside the latter at the linear speed of the latter, and when the desired length of tubing has emerged from the finning machine, the saw is caused to be deflected to cut the finned tubing. The tongs then open to drop the cut-off tubing between clamps, the saw returning to its initial position. The clamps then close and hold the cut-off tubing securely while the fins at its ends are pushed back, and the burrs at its ends removed, following which the clamps are opened and the cut-off tubing is caused to fall out of the machine, it now being in a condition to be placed in a coil. The foregoing operations are repeated without stopping the finning machine.

An object of this invention is to cut finned tubing to desired lengths as it emerges from a finning machine.

Another object of this invention is to cause finned tubing to follow a straight path as it emerges from a finning machine.

Another object of this invention is to cut finned tubing into desired lengths as it emerges from a finning machine, and to prepare the cut-off tubing for application to heat exchange coils.

Another object of this invention is to prevent finned tubing from being damaged while it is being cut to predetermined lengths as it emerges from a finning machine.

This invention will now be described with reference to the annexed drawings, of which:

Fig. 1 is a diagrammatic view of one embodiment of this invention;

Fig. 2 is an enlarged detail view of the half-nut and its associated air cylinder used for starting movement of the saw of Fig. 1;

Fig. 3 is an enlarged detail view showing how the saw is deflected to cut the finned tube;

Fig. 4 is a detail view of the cam used in Fig. 3;

Fig. 9 is a diagrammatic view of the control system of Fig. 1, showing the air cylinders, their associated valves and the interconnecting tubing.

Figure 5:
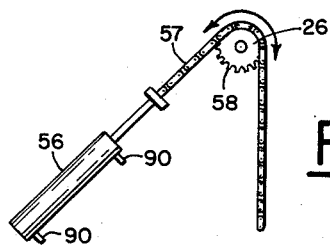
Fig. 5 is a detail view showing the air cylinder, chain and sprocket used for returning the cylindrical cam of Fig. 1 to its initial position.

A finning machine 10 which may be of the type disclosed in my co-pending application, Serial No. 464,388, now Patent No. 2,799,389 moves a finned tube 11 outwardly (to the right facing Fig. 1), the tube revolving as it advances as a result of the finning operation. The finned tube advances on the spaced-apart rollers 12 and 13, and passes successively between rollers 14 of spaced-apart tongs T1, T2, T3, T4, T5, T6 and T7.

The finning machine 10 drives through a shaft 15, pulley 16, belt 17, pulley 18, shaft 19, pulley 20, belt 21, pulley 22 and shaft 23, a gear box 24 which, in turn, drives at a reduced speed through a slippable clutch 25, a cylindrical cam 26.

The inner portion of the shaft 19 has spiral threads 30 thereon which are adapted to be engaged by the correspondingly threaded portion of a half-nut 31 as will be described later.

The upper portion of a plate 32 is slidably pivoted on the shaft 19 beyond the ends of its threads 30, and supports an air cylinder 33 for moving the half-nut 31, and an electric motor 34 to the shaft of which is attached a rotary saw 35. The lower right corner of the plate 32 is cut away to provide clearance for the saw. When the air cylinder 33 causes the half-nut 31 to engage the threaded portion of the shaft 19, the plate is moved to the right alongside the tube 11.

As shown by Figs. 3 and 4, the plate 32 has attached thereto adjacent its lower edge, a bar 36, in the lower end of which is journalled a rotary cam follower 37 which initially moves in a passage between plates 38 and 39 when the plate is moved to the right, and then is deflected by a pivoted cam 40, following which it passes into a passage between the plate 38 and another plate 41. When the cam follower is in the passage between the plates 38 and 39 or is in the passage between the plates 38 and 41, and plate 32 is in the position shown by the continuous lines of Fig. 3. When the cam follower 37 passes over the cam 40, the plate 32 is deflected to the position shown by the dashed lines of Fig. 3 for cutting a revolving finned tube 11. When the plate 32 is returned to its initial position by a coiled spring 43 as will be described later, the cam follower 37 will return to its original position in a straight path while maintaining contact with the plate 38, deflecting the upper end 40A of the cam 40 downwardly as it moves past it. A coiled spring 42 restores the cam 40 to its original position after the cam follower 37 has passed it on its way back to its initial position.

The cylindrical cam 26 has raised cam surfaces S1, S2, S3, S4, S5, S6 and S7 which, as the cam is rotated, contact in succession the plungers of valves V1, V2, V3, V4, V5, V6 and V7, respectively, which open the latter in succession for admitting compressed air into the actuating cylinders C1, C2, C3, C4, C5, C6 and C7 respectively, of the tongs T1, T2, T3, T4, T5, T6 and T7 respectively. The rate of rotation of the cam 26, the lengths of the raised cam surfaces, and the locations of the tongs are so arranged that when the advancing end of a finned tube passes a tong, that tong is closed by its associated air cylinder so as to place its rollers 14 closely adjacent the finned tube for preventing it from moving laterally. Thus, when the advancing end of the finned tube passes the tongs T1, the raised cam surface S1 will open the valve V1 to admit air into the cylinder C1, causing the tongs T1 to close its rollers 14 about the tube, and so on.

A sprocket 58 is secured to one end of the cam 26, and is meshed with a chain 57, one end of which is free, and the other end of which is attached to the piston rod of an air cylinder 56. Rotation of the cam 26 by the gear box 24 as described, causes the chain 57 to pull the piston of the cylinder 56 outwardly.

There is a target disc 50 aligned with the axis of the tube 11, which, when the advancing end of the tube strikes it, moves a slidable shaft 51 on which it is mounted, through an apertured support 49 against the action of a coiled spring 53, to open a valve V8 which admits air into the air cylinder 52 on one side of its piston which then moves the support 49 and its target disc assembly away from the adjacent end of the tube 11. At the same time, the valve V8 admits compressed air into the cylinder 33 on one side of its piston which then moves the half-nut 31 into engagement with the threads 30 on the shaft 19, causing the plate 32 which carries the saw 35 to move alongside the tube in the direction the latter moves, and at the speed of the linear movement of the tube.

As the plate 32 moves forwardly, a pivoted lug 55 it carries, opens valve V9 which admits compressed air into the cylinder 56 (Figs. 5 and 9), the piston of which then pulls back the chain 57 which is meshed with the sprocket 58 on the cam 26. This restores the cam 26 to its initial position, the slippable clutch 25 permitting this to take place although at this time the clutch is attempting to rotate the cam in the opposite direction.

Figure 6:
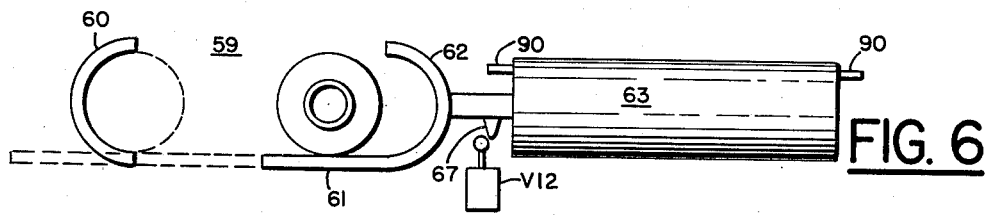
Fig. 6 is an enlarged detail view showing one of the tube clamps and its associated air cylinder.
Figure 7:
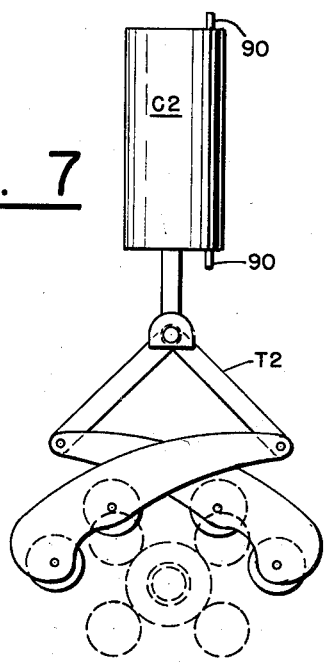
Fig. 7 is an enlarged detail view of one of the tongs and its associated air cylinder.

By this time, the rotary cam follower 37 will have been moved by the forward movement of the plate 32, over its cam 40, causing the plate 32 to be deflected to the position shown by the dashed lines of Fig. 3 so that the saw 35 cuts through the tube 11. The tongs T1–T7 will all open at this time as a result of the cam 26 being returned to its initial position, permitting the valves V1–V7 to exhaust the compressed air previously admitted into the cylinders C1–C7, springs within the latter causing their pistons to be retracted. The cut-off tube then drops down between a pair of clamps 59 which are located adjacent the ends of the cut-off tube. Each clamp 59 consists of a semi-cylindrical clamping member 60 which is fixed, and a matching clamping member 62 which is slidable by the piston rod of an air cylinder 63 towards and from the member 60. Plates 61 are attached to the lower ends of the members 60 and are adapted to pass through slots in the members 62 when the members 60 are moved towards the members 62. When the tongs T1–T7 open, the cut-off tube is dropped onto the plates 61 between the members 60 and 62. Normally, as shown by Fig. 6, there are openings between the clamp members 60 and the adjacent ends of the plates 61.

The plate 32 continues to advance until a lug 64 which is pivoted thereto opens an air valve V10 which admits compressed air into the cylinder 33 on the other side of its piston, causing the latter to move the half-nut 31 out of engagement with the threaded portion of the shaft 19. The spring 43 then pulls the plate 32 back to its initial position. At the same time, the valve V10 admits compressed air into the cylinder 52 on the other side of its piston which then returns the assembly of the target disc 50 to its initial position.

Each of the cylinders 33, 52, 56, 63 and 70 has capillary tubes 90 in its ends which leak off the compressed air supplied into such cylinders so that when their pistons have moved to one extreme position, the compressed air which moved them to that position leaks out by the time compressed air is to be admitted into the cylinders to move their pistons to the opposite extreme position.

Figure 10:
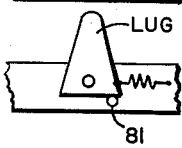
Fig. 10 is an enlarged detail view of one of the valve opening lugs.

The pivoted lugs 55 and 64 and the other pivoted lugs to be described, are constructed as shown by Fig. 10, so that each has a stop 81 which prevents it from pivoting when it is moved forward to open an associated valve. The lug is free to rotate in the opposite direction and so does not open its associated valve when it is on its way back to its original position.

During the procedure described in the foregoing, the finning machine continues to supply finned tubing, and to drive the shaft 19 and the cylindrical cam 26. When the first tongs T1 are closed around the advancing end of the next length of tubing by the cylinder C1, a pivoted lug 66 on its piston rod opens valve V11 which admits air into the cylinders 63 on one side of their pistons causing the latter to move the clamp members 62 towards the respective clamp members 60 for clamping the cut-off tube therebetween, at which time the clamp members 62 and the plates 61 move the tube into contact with the clamp members 60, the adjacent ends of the plates 61 sliding through slots in the members 60.

Figure 8:
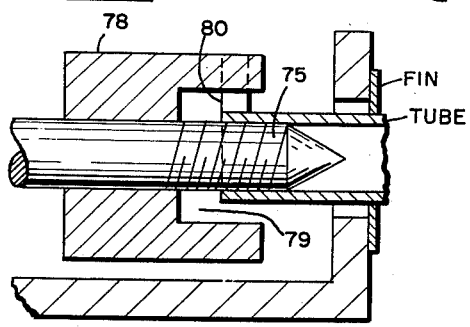
Fig. 8 is an enlarged detail view of one of the tools used for pushing back the fins from the ends of a cut-off tube, and for removing burrs from its ends.

The piston rod of one of the cylinders 63 carries a pivoted lug 67 which when the clamp members 62 are moved forward, opens a valve V12 which admits compressed air into cylinders 70 on one side of their pistons causing the latter to move forwardly a pair of tube processing assemblies, each consisting of a supporting frame 71, a rotary shaft 75 extending through its respective cylinder 70 along its axis, and rotated by pulleys 72, belt 73 and electric motor 74. Each frame 71 has an inner, vertically extending portion 76 with an opening therein through which the inner end of the shaft 75 extends, and an outer, vertically extending portion 77 with an opening through which an end of the cut-off tube extends as shown by Fig. 8. The end of each shaft 75 opposite the end having the pulley 72 thereon is threaded, and has an outer diameter equal to the inner diameter of the tube on which the fins are wound. Its threads are pitched so that as they are rotated when the shaft is moved into the tube, they cut away and remove any burrs on the inside of the tube end. The same shaft end has attached thereto a cylindrical member 78 having a cylindrical recess 79 which is larger in diameter than the outer diameter of the tube on which the fins are wound. A knife-edged tool 80 is attached to the member 78 and extends into the recess 79 so that it contacts the outer surface of the adjacent end of the tube on which the fin is wound when the shaft 75 is moved into the tube, and removes any burrs on the outside of the tube. When the support 71 is moved forwardly by its cylinder 70, the adjacent surface of its vertically extending portion 77 pushes back the fins at the tube end as shown by Fig. 8. The removal of the burrs and the pushing back of the fins places the cut-off tube in condition to be assembled into a coil.

When one of the supports 71 has reached its most forward position, a pivoted lug 82 carried thereby, adjusts a valve V13 which admits compressed air into the cylinders 70 on the other sides of their pistons, causing the latter to move the supports 71 back to their initial positions. On their way back, a pivoted lug 84 on one of the supports 71, opens a valve V14 which admits compressed air into the cylinders 63 on the other sides of their pistons, causing the clamp members 62 to be moved back to their initial positions, permitting the cut-off tube to drop out of the clamps through the spaces between the clamp members 60 and the adjacent ends of the plates 61 as shown by Fig. 6.

The finning machine 10 operates continuously, and operates the threaded shaft 19 and the cylindrical cam 26 continuously. The electric saw motor 34 operates continuously as do the electric motors 74 of the tube processing assembly, so that as the finned tubing emerges from the finning machine it is automatically cut into predetermined lengths which are automatically placed in condition to be assembled into coils.

The length of the cut-off tubes can be varied by moving the assembly of the target disc 50 nearer to or further from the saw carrying plate 32.

While one embodiment of this invention has been described for the purpose of illustration, it should be understood that the invention is not limited to the exact apparatus and arrangement of apparatus illustrated and described since modifications thereof may be suggested by those skilled in the art, without departure from the essence of the invention.

What I claim as my invention, is:

1. Mechanism for cutting off a length of rotating finned tube emerging from a machine having means for advancing the tube therefrom, and for rotating the tube, comprising a plurality of sets of rollers spaced apart along the path of travel of said finned tube as it emerges from said machine, each of said sets comprising a plurality of rollers arranged around said path normally out of contact with a finned tube travelling along said path, means including means synchronized with said advancing means for causing the rollers of said sets in succession to closely approach the rotating finned tube as it passes said sets, a rotary saw, a support for said saw supported for movement alongside of said path with the saw normally out of contact with a finned tube travelling along said path, means including means actuated by the advancing end of said tube for causing said support to move alongside said path in the direction of linear movement of said tube and during said movement of said support for causing said support to move towards said tube for causing said saw to cut off said tube, and means actuated after the cutting off of said tube for causing said rollers to move away from the cut-off tube so as to permit the cut-off tube to drop from between said rollers, for stopping the movement of said support, and for then causing said support to return to its initial position.

2. Mechanism for supporting a rotating finned tube as it emerges from a machine having means for advancing the tube therefrom, and for rotating the tube, comprising a plurality of sets of rollers spaced apart along the path of travel of the finned tube as it emerges from said machine, each of said sets comprising a plurality of rollers arranged around said path normally out of contact with a finned tube travelling along said path, and means including means synchronized with said advancing means for causing the rollers of said sets in succession to closely approach the finned tube as it passes said sets.

3. The invention claimed in claim 2 in which each set of rollers is rotatably supported by a pair of tong-like supports around said path, and in which said synchronized means acts to close said tong-like members.

4. The invention claimed in claim 3 in which the synchronized means includes a cam rotated with said rotating and advancing means, includes cam followers, one for each of said sets, and includes means actuated by the cam followers for closing said tong-like members.

5. The invention claimed in claim 2 in which means including means actuated by the advancing end of the finned tube is provided for causing the rollers of said sets simultaneously move away from the finned tube.

References Cited in the file of this patent

UNITED STATES PATENTS

| 2,287,833 | Ridgway | June 30, 1942 |
| 2,618,047 | Mansell | Nov. 18, 1952 |
| 2,746,126 | Talbot | May 22, 1956 |

FOREIGN PATENTS

| 26,067 | Great Britain | Nov. 11, 1909 |